US012537419B2

(12) United States Patent
Lemmers, Jr. et al.

(10) Patent No.: US 12,537,419 B2
(45) Date of Patent: Jan. 27, 2026

(54) GENERATOR HOUSING AND ASSEMBLIES

(71) Applicant: Hamilton Sundstrand Corporation, Charlotte, NC (US)

(72) Inventors: Glenn C. Lemmers, Jr., Loves Park, IL (US); Mark J. Franklin, Janesville, WI (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 453 days.

(21) Appl. No.: 18/105,748

(22) Filed: Feb. 3, 2023

(65) Prior Publication Data

US 2024/0266915 A1 Aug. 8, 2024

(51) Int. Cl.
*H02K 7/18* (2006.01)
*H02K 5/08* (2006.01)

(52) U.S. Cl.
CPC .............. *H02K 7/1823* (2013.01); *H02K 5/08* (2013.01)

(58) Field of Classification Search
CPC .......... H02K 7/1823; H02K 5/08; H02K 5/04; H02K 1/185
See application file for complete search history.

(56) References Cited

U.S. PATENT DOCUMENTS

| | | | |
|---|---|---|---|
| 9,003,811 B2 | 4/2015 | Barnett et al. | |
| 10,801,410 B2 | 10/2020 | Roberge | |
| 11,156,128 B2 | 10/2021 | Miller et al. | |
| 2017/0335795 A1* | 11/2017 | Klemen | H02K 5/203 |
| 2021/0281145 A1* | 9/2021 | Lemmers, Jr. | F01D 25/24 |
| 2023/0068540 A1* | 3/2023 | Tauchen | H02K 1/20 |

FOREIGN PATENT DOCUMENTS

| | | | | |
|---|---|---|---|---|
| CN | 1890185 A | * | 1/2007 | ............. C02F 9/20 |
| CN | 105981262 A | * | 9/2016 | ............. H02K 1/28 |
| EP | 0874444 A1 | * | 10/1998 | ............. H02K 5/20 |
| EP | 3879074 A1 | | 9/2021 | |
| WO | WO-0016465 A1 | * | 3/2000 | ............. H02K 1/185 |
| WO | 2021165630 A1 | | 8/2021 | |

OTHER PUBLICATIONS

European Search Report dated Jul. 19, 2024 in connection with European Patent Application No. 24155865.9, 6 pages.

* cited by examiner

*Primary Examiner* — Mohamad A Musleh

(57) ABSTRACT

A housing for a generator assembly can include an outer housing shell configured to enclose a plurality of generator components and a stator baffle disposed within the outer housing shell at a distance from an inner surface of the outer housing shell to form an air gap between the stator baffle and the outer housing shell to thermally insulate the plurality of generator components. The stator baffle can be configured to mount to a stator assembly of the generator components.

20 Claims, 6 Drawing Sheets

GENERATOR HOUSING AND ASSEMBLIES

FIELD

This disclosure relates to generator housings and assemblies.

BACKGROUND

Generator operation in an elevated ambient temperature environment increases the risk that heat absorption from the surrounding environment can damage the generator stator winding impregnation epoxy and/or other components. Traditional generator assemblies cannot operate in high temperature environments (e.g., exceeding 1000 F), for example.

Conventional methods and systems have generally been considered satisfactory for their intended purpose. However, there is still a need in the art for improvements. The present disclosure provides a solution for this need.

SUMMARY

A housing for a generator assembly can include an outer housing shell configured to enclose a plurality of generator components and a stator baffle disposed within the outer housing shell at a distance from an inner surface of the outer housing shell to form an air gap between the stator baffle and the outer housing shell to thermally insulate the plurality of generator components. The stator baffle can be configured to mount to a stator assembly of the generator components.

The stator baffle can have a cylindrical hoop shape, for example. Other suitable shapes are contemplated herein that can surround the stator (e.g., to enclose a cooling oil pathway).

The stator baffle can be connected to the inner surface of the outer housing shell by one or more supports. In certain embodiments, the one or more supports can include a tapering shape configured to have less cross-sectional area at the inner surface of the outer housing shell than at the stator baffle. In certain embodiments, the one or more supports include curved sides.

In certain embodiments, at least one of the one or more supports can be configured to house one or more fluid and/or electrical lines to pass through from the outer housing to the stator baffle. In certain embodiments, the one or more supports can include a plurality of supports. One or more of the plurality of supports can be different in shape, size, and/or internal structure than one or more other supports of the plurality of supports.

In certain embodiments, the housing is made of a titanium alloy. The housing can be made of any suitable material for high temperature application, and can be manufactured using additive manufacturing, investment casting, etc.

In accordance with at least one aspect of this disclosure, a generator assembly for a high temperature environment can include a housing. The housing can be any suitable housing disclosed herein, e.g., as described above.

In accordance with at least one aspect of this disclosure, a turbomachine can include a tail cone downstream of a hot turbine, and a generator assembly disposed in the tail cone. The generator assembly can include any suitable generator assembly disclosed herein, e.g., as described above.

These and other features of the embodiments of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION

Figure 1:
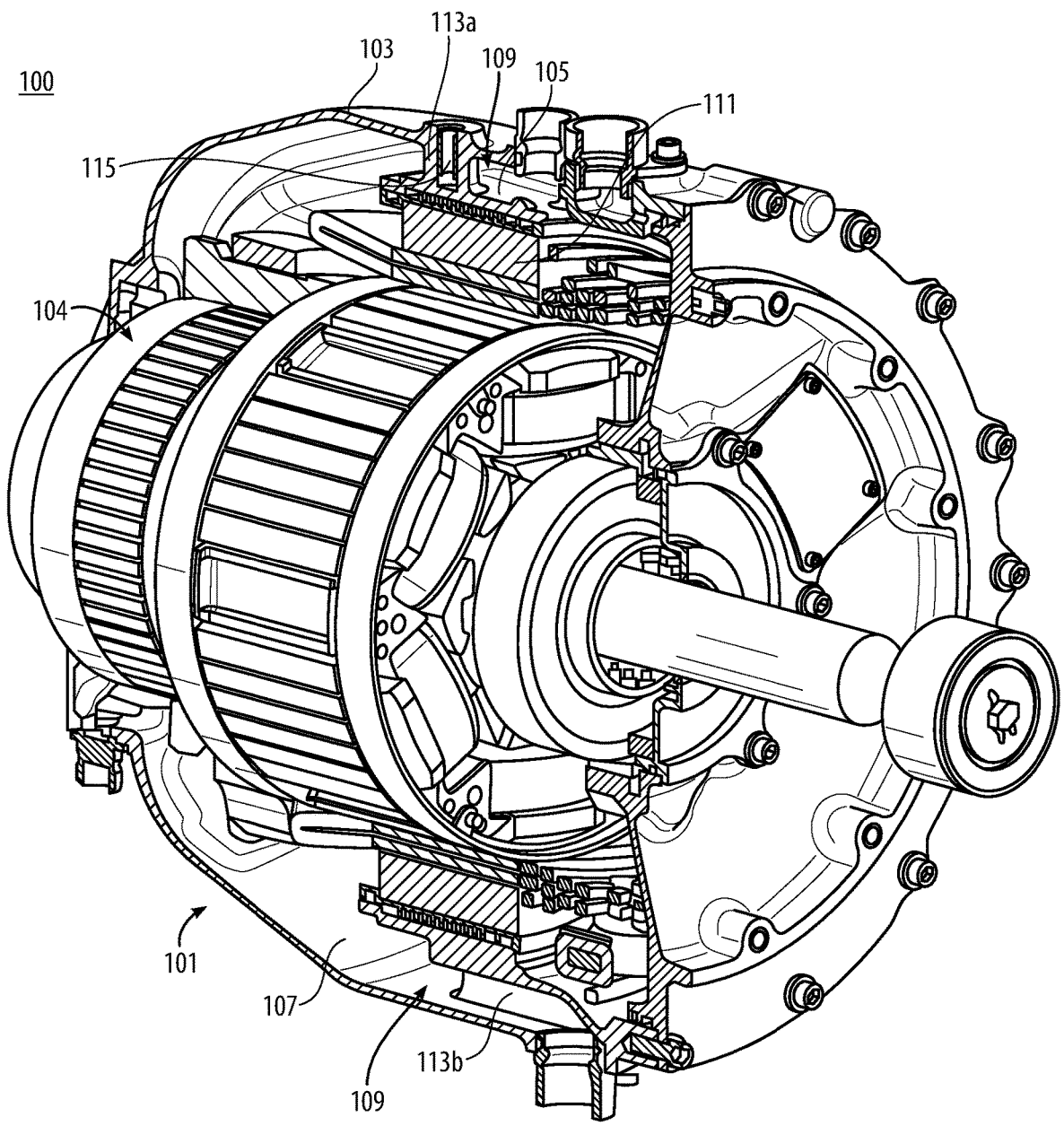
FIG. 1 is a partial cross-sectional perspective view of an embodiment of a generator assembly in accordance with this disclosure, showing an embodiment of housing in accordance with this disclosure.

Reference will now be made to the drawings wherein like reference numerals identify similar structural features or aspects of the subject disclosure. For purposes of explanation and illustration, and not limitation, an illustrative view of an embodiment of a generator assembly in accordance with the disclosure is shown in FIG. 1 and is designated generally by reference character 100. Other embodiments and/or aspects of this disclosure are shown in FIGS. 2-6.

Figure 2:
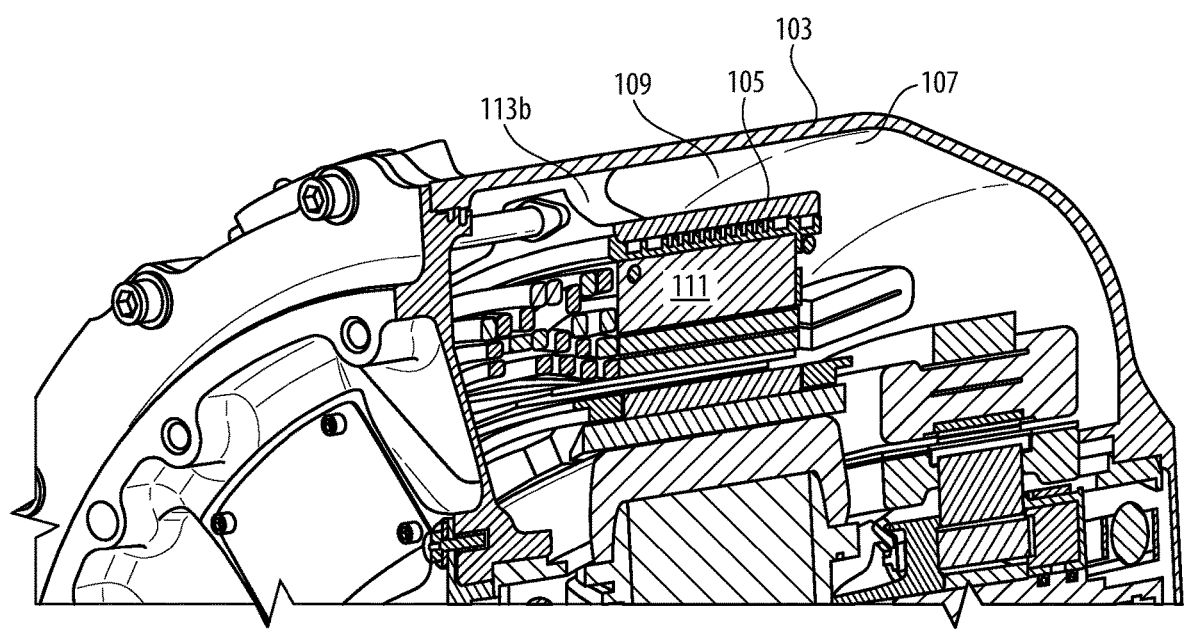
FIG. 2 is a partial cross-sectional view of the embodiment of FIG. 1.
Figure 3:
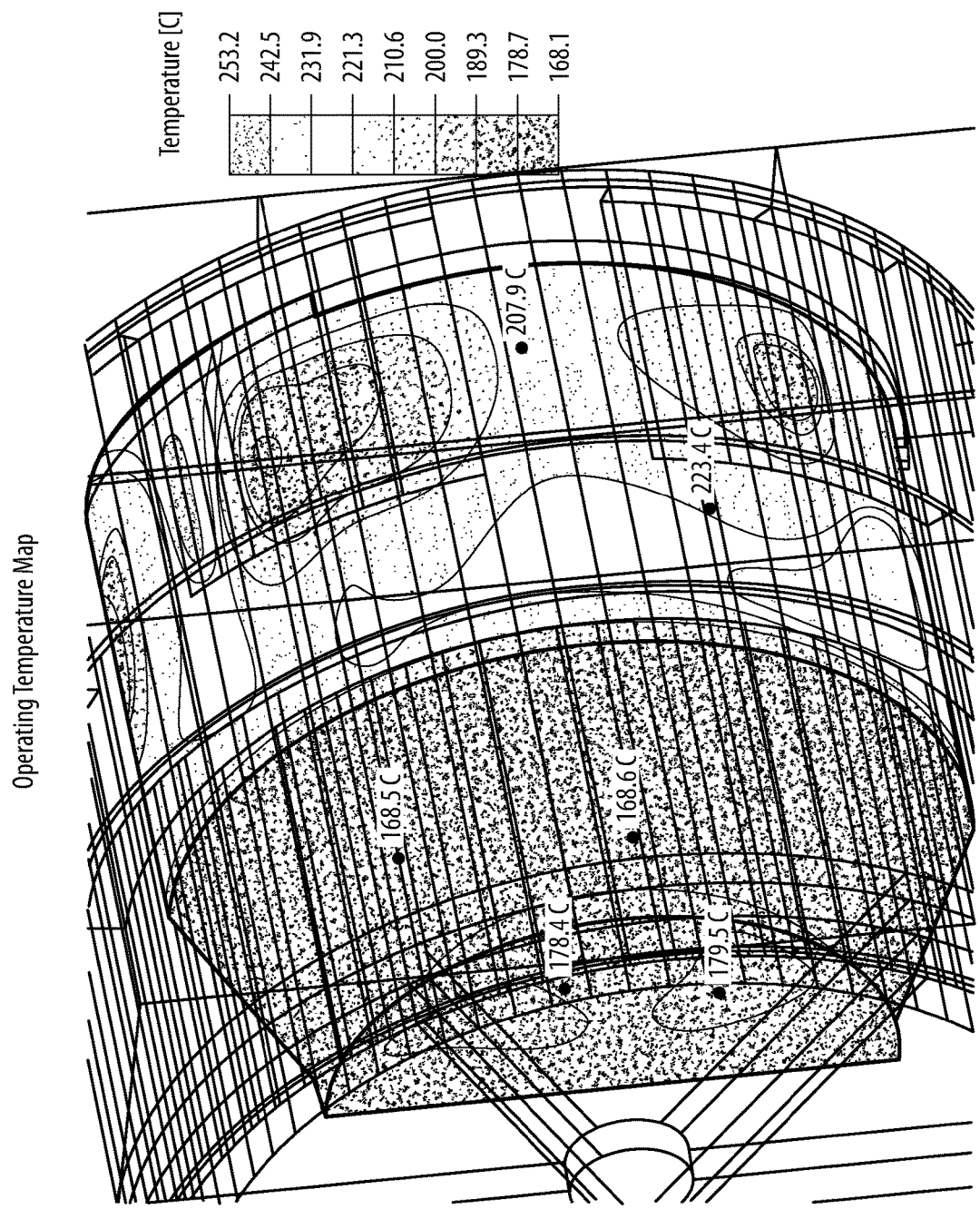
FIG. 3 shows an operating temperature map of an embodiment of this disclosure.
Figure 4:
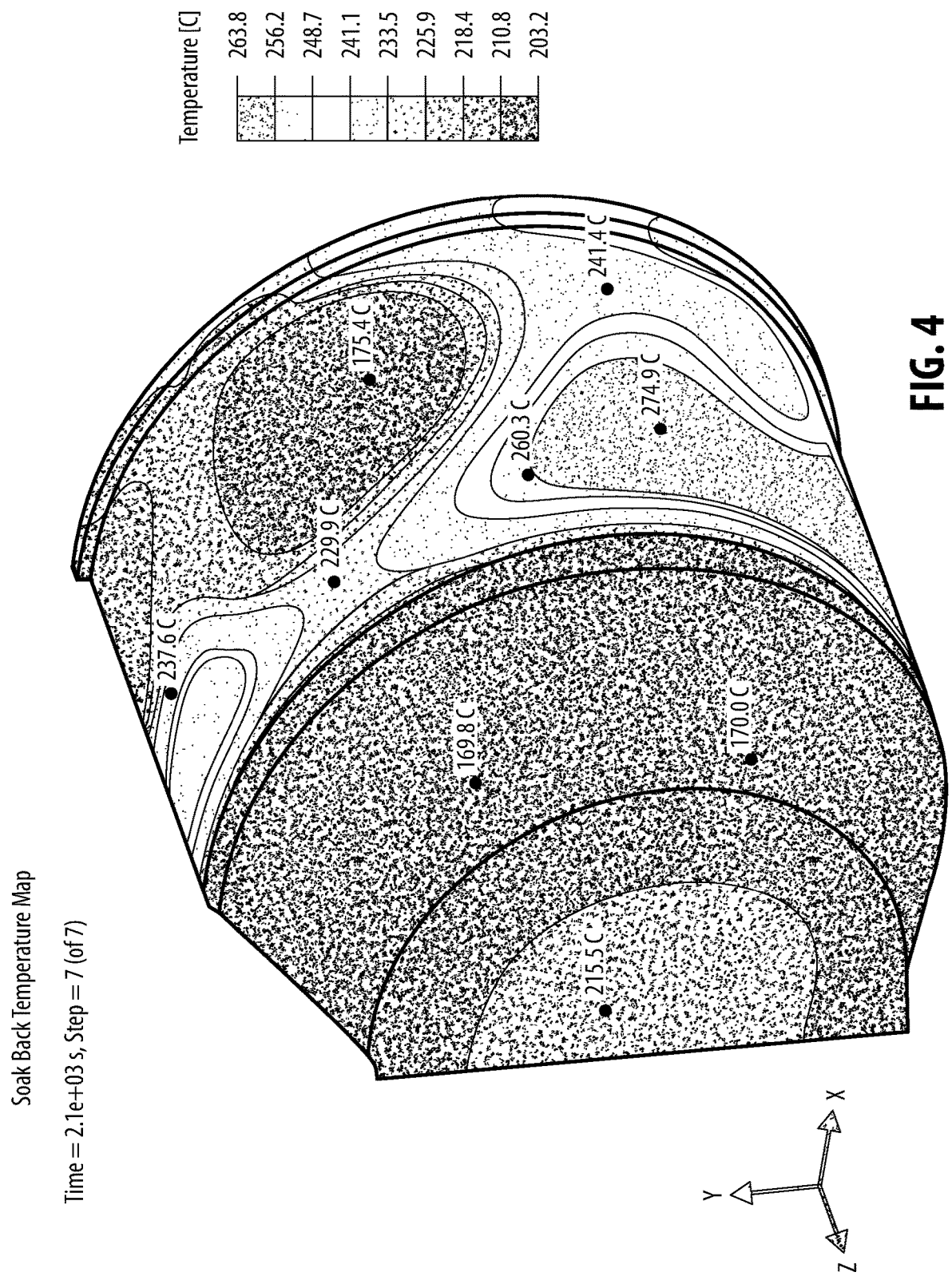
FIG. 4 shows a soak back temperature map of the embodiment of FIG. 3.

Referring to FIGS. 1 and 2, a generator assembly 100 is shown. The generator assembly 100 can include a housing 101 which can include an outer housing shell 103 configured to enclose a plurality of generator components 104. The housing 101 can include a stator baffle 105 disposed within the outer housing shell 103 at a distance from an inner surface 107 of the outer housing shell 103 to form an air gap 109 between the stator baffle 105 and the outer housing shell 103 to thermally insulate the plurality of generator components 104. The stator baffle 105 can be configured to mount to a stator assembly 111 of the generator components 104.

The stator baffle 105 can have a cylindrical hoop shape, e.g., as shown, for example. Any other suitable shapes are contemplated herein that can surround the stator assembly 111 (e.g., to enclose a cooling oil pathway) are contemplated herein. The stator assembly 111 can be mounted to the stator baffle 105, for example such that the stator baffle 105 supports the stator assembly 111.

The stator baffle 105 can be connected to the inner surface 107 of the outer housing shell 103 by one or more supports 113a, 113b. In certain embodiments, the one or more supports 113b can include a tapering shape configured to have less cross-sectional area at the inner surface 107 of the outer housing shell 103 than at the stator baffle 105 (e.g., as shown in FIG. 2). In certain embodiments, the one or more supports 113b include curved sides.

In certain embodiments, at least one of the one or more supports 113a can be configured to house one or more fluid and/or electrical lines 115 to pass through from the outer housing 103 to the stator baffle 105 (e.g., as shown in FIG. 1). In certain embodiments, the one or more supports 113a, 113b can include a plurality of supports 113a, 113b, e.g., as shown. Any suitable number of supports 113a, 113b (e.g., two, three, or more) are contemplated herein. The supports 113a, 113b can include any suitable shape and be configured to minimize convective heat transfer from the outer housing shell 103 to the stator baffle 105. As shown, one or more of the plurality of supports 113a, 113b can be different in shape, size, and/or internal structure than one or more other supports 113b, 113a of the plurality of supports 113a, 113b.

In certain embodiments, the housing 101 is made of a titanium alloy. The housing 101 can be made of any suitable material for high temperature application, and can be manufactured using additive manufacturing, investment casting, or any other suitable method.

In accordance with at least one aspect of this disclosure, a generator assembly, e.g., assembly 100 for a high temperature environment can include a housing. The housing can be any suitable housing disclosed herein, e.g., housing 101 as described above.

In accordance with at least one aspect of this disclosure, a turbomachine (not shown in entirety) can include a tail cone 500 downstream of a hot turbine (e.g., exhaust over 1000 degrees F., e.g., about 1250 degrees F.), and a generator assembly, e.g., assembly 100 disposed in the tail cone 500. The generator assembly can include any suitable generator assembly disclosed herein, e.g., assembly 100 as described above.

Embodiments can include a structure that creates an air gap between a stator housing and an outer housing. In certain embodiments, the air gap can be about 1 inch or about ½ inch, for example. Embodiments can include support posts for mounting and connecting electrical/fluid lines. Embodiments thermally isolate the stator and other parts, e.g., the exciter, from hot turbine exhaust with an air gap.

Figure 5:
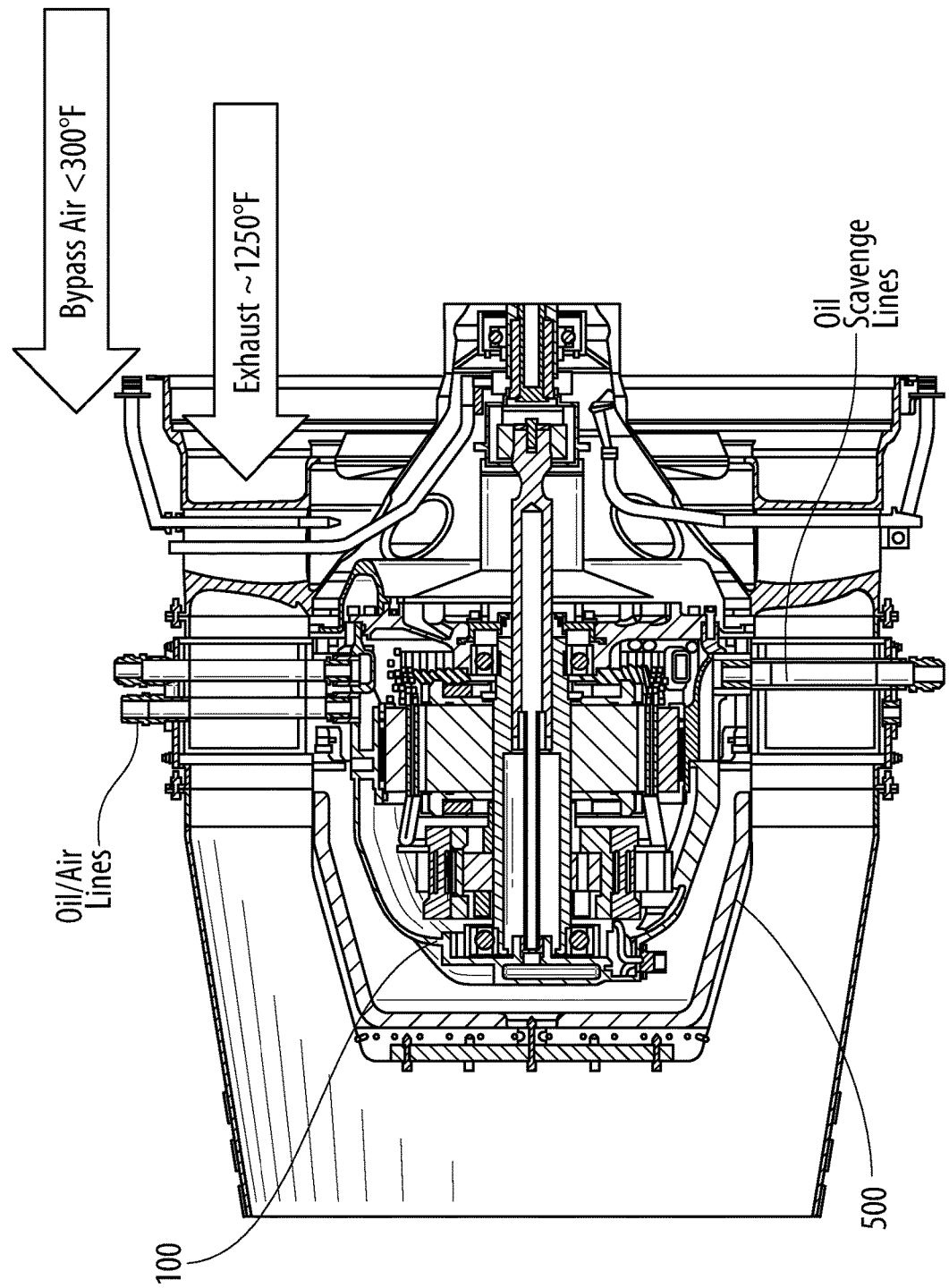
FIG. 5 is a cross-sectional view of the embodiment of FIG. 1, shown disposed in a tail cone of a turbomachine.
Figure 6:
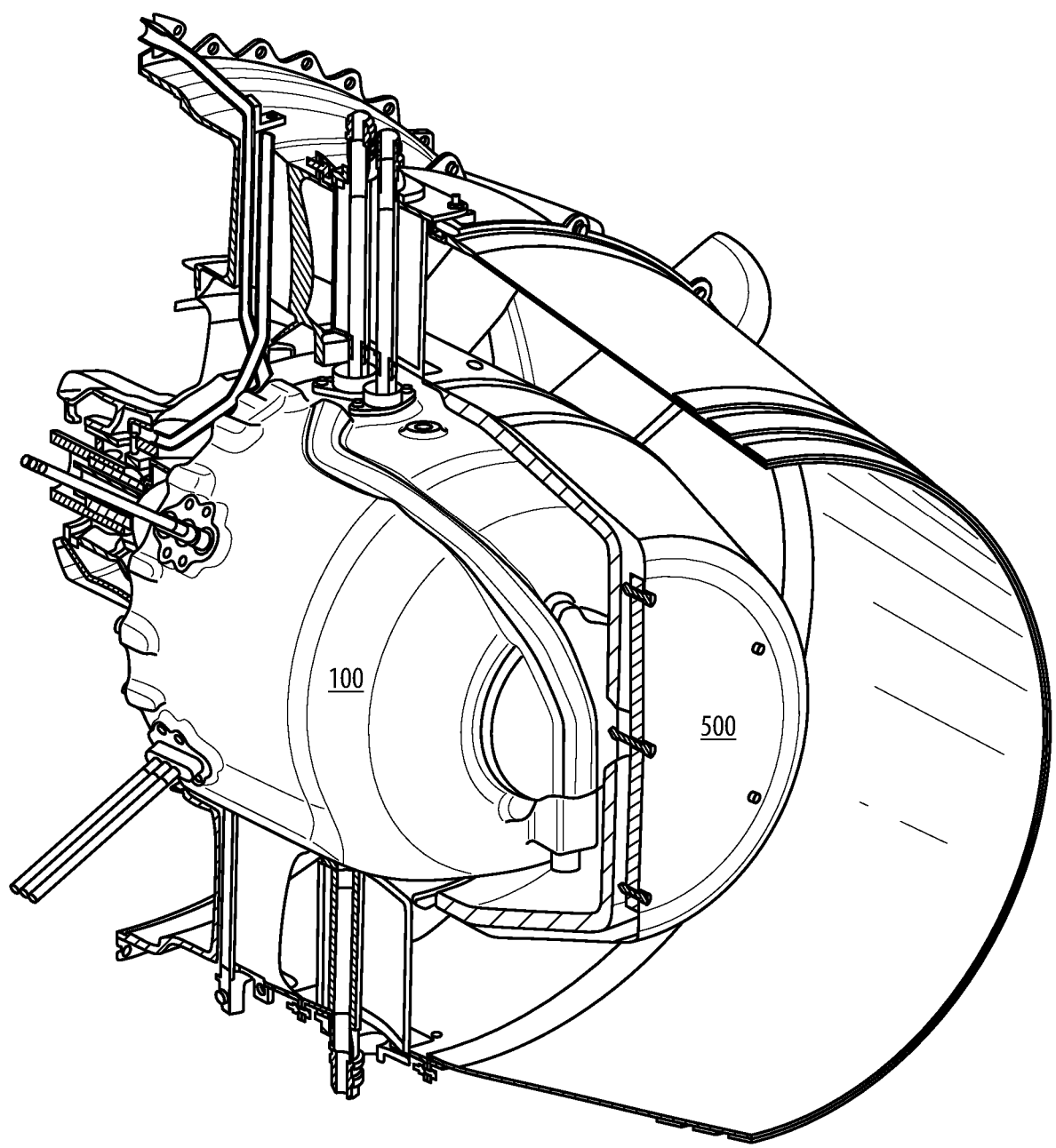
FIG. 6 is a partially sectioned perspective view of the embodiment of FIG. 5.

FIG. 5 is a cross-sectional view of the embodiment of FIG. 1, shown disposed in a tail cone of a turbomachine. FIG. 6 is a partially sectioned perspective view of the embodiment of FIG. 5. Soak back is when heat is soaking into hot areas after shutdown of the engine. Temperature actually increases around hot areas after engine shut down because there is no flow.

Embodiments allow for isolating the generator main stator from the generator exterior walls and creates a low conductive heat path from the generator hot surrounding ambient air to the main stator windings. Such a high resistance thermal conduction path mitigates operational and shut down heat soak back from the environment being sunk into the main stator windings and potentially damaging the winding epoxies, for example.

Those having ordinary skill in the art understand that any numerical values disclosed herein can be exact values or can be values within a range. Further, any terms of approximation (e.g., "about", "approximately", "around") used in this disclosure can mean the stated value within a range. For example, in certain embodiments, the range can be within (plus or minus) 20%, or within 10%, or within 5%, or within 2%, or within any other suitable percentage or number as appreciated by those having ordinary skill in the art (e.g., for known tolerance limits or error ranges).

The articles "a", "an", and "the" as used herein and in the appended claims are used herein to refer to one or to more than one (i.e., to at least one) of the grammatical object of the article unless the context clearly indicates otherwise. By way of example, "an element" means one element or more than one element.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of."

Any suitable combination(s) of any disclosed embodiments and/or any suitable portion(s) thereof are contemplated herein as appreciated by those having ordinary skill in the art in view of this disclosure.

The embodiments of the present disclosure, as described above and shown in the drawings, provide for improvement in the art to which they pertain. While the subject disclosure includes reference to certain embodiments, those skilled in the art will readily appreciate that changes and/or modifications may be made thereto without departing from the spirit and scope of the subject disclosure.

What is claimed is:

1. A housing for a generator assembly, comprising:
an outer housing shell configured to enclose a plurality of generator components; and
a stator baffle disposed completely within the outer housing shell at a distance from an inner surface of the outer housing shell to form an air gap between the stator baffle and the outer housing shell to thermally insulate the plurality of generator components, the stator baffle configured to mount to a stator assembly of the plurality of generator components.

2. The housing of claim 1, wherein the stator baffle has a cylindrical hoop shape.

3. The housing of claim 1, wherein the stator baffle is connected to the inner surface of the outer housing shell by one or more supports.

4. The housing of claim 3, wherein the one or more supports include a tapering shape configured to have less cross-sectional area at the inner surface of the outer housing shell than at the stator baffle.

5. The housing of claim 4, wherein the one or more supports include curved sides.

6. The housing of claim 3, wherein at least one of the one or more supports is configured to house one or more fluid and/or electrical lines to pass through from the outer housing shell to the stator baffle.

7. The housing of claim 1, wherein the housing is made of a titanium alloy.

8. A generator assembly for a high temperature environment, comprising:
a housing comprising:
an outer housing shell configured to enclose a plurality of generator components; and
a stator baffle disposed completely within the outer housing shell at a distance from an inner surface of the outer housing shell to form an air gap between the stator baffle and the outer housing shell to thermally insulate the plurality of generator components, the stator baffle configured to mount to a stator assembly of the plurality of generator components.

9. The assembly of claim 8, wherein the stator baffle has a cylindrical hoop shape.

10. The assembly of claim 8, wherein the stator baffle is connected to the inner surface of the outer housing shell by one or more supports.

11. The assembly of claim 10, wherein the one or more supports include a tapering shape configured to have less cross-sectional area at the inner surface of the outer housing shell than at the stator baffle.

12. The assembly of claim 11, wherein the one or more supports include curved sides.

13. The assembly of claim 10, wherein at least one of the one or more supports is configured to house one or more fluid and/or electrical lines to pass through from the outer housing shell to the stator baffle.

14. The assembly of claim 10, wherein the housing is made of a titanium alloy.

15. A turbomachine, comprising:
a tail cone downstream of a hot turbine; and
a generator assembly disposed in the tail cone and comprising:
a housing comprising:
an outer housing shell configured to enclose a plurality of generator components; and
a stator baffle disposed completely within the outer housing shell at a distance from an inner surface of the outer housing shell to form an air gap between the stator baffle and the outer housing shell to thermally insulate the plurality of generator components, the stator baffle configured to mount to a stator assembly of the plurality of generator components.

16. The turbomachine of claim 15, wherein the stator baffle has a cylindrical hoop shape.

17. The turbomachine of claim 15, wherein the stator baffle is connected to the inner surface of the outer housing shell by one or more supports.

18. The turbomachine of claim 17, wherein the one or more supports include a tapering shape configured to have less cross-sectional area at the inner surface of the outer housing shell than at the stator baffle.

19. The turbomachine of claim 18, wherein the one or more supports include curved sides.

20. The turbomachine of claim 17, wherein at least one of the one or more supports is configured to house one or more fluid and/or electrical lines to pass through from the outer housing shell to the stator baffle.

* * * * *